(12) United States Patent
Koch

(10) Patent No.: US 10,240,718 B2
(45) Date of Patent: Mar. 26, 2019

(54) COVER AND METHODS OF MAKING AND USING SAME

(71) Applicant: Michael Koch, Luther, OK (US)

(72) Inventor: Michael Koch, Luther, OK (US)

( * ) Notice: Subject to any disclaimer, the term of this patent is extended or adjusted under 35 U.S.C. 154(b) by 0 days.

(21) Appl. No.: 15/412,541

(22) Filed: Jan. 23, 2017

(65) Prior Publication Data

US 2017/0211746 A1   Jul. 27, 2017

Related U.S. Application Data

(60) Provisional application No. 62/286,087, filed on Jan. 22, 2016.

(51) Int. Cl.
*F16N 21/06* (2006.01)
*F16N 3/12* (2006.01)

(52) U.S. Cl.
CPC ............. *F16N 21/06* (2013.01); *F16N 3/12* (2013.01)

(58) Field of Classification Search
CPC ..... F16N 3/12; F16N 3/00; F16N 3/10; F16N 5/00; F16N 5/02; F16N 31/00; F16N 31/02; F16N 99/00; F16N 21/06
USPC ..................................... 138/96 R, 89.3, 89.4
See application file for complete search history.

(56) References Cited

U.S. PATENT DOCUMENTS

| | | | | |
|---|---|---|---|---|
| 658,313 A * | 9/1900 | Bernardi | ............... | F16B 7/0426 138/89 |
| 1,524,492 A * | 1/1925 | Wenzel | ............... | F16N 3/12 184/105.2 |
| 1,556,966 A * | 10/1925 | Selig | ............... | G05G 1/12 135/77 |
| 2,304,532 A * | 12/1942 | Boxley | ............... | A61J 9/04 138/96 R |
| 2,321,667 A * | 6/1943 | Foster | ............... | F16L 55/1141 138/89 |
| 2,705,336 A * | 4/1955 | Wilson | ............... | B25G 3/30 138/89.4 |
| 2,899,112 A * | 8/1959 | Morton | ............... | F16N 3/12 222/256 |
| 3,574,312 A * | 4/1971 | Miller | ............... | B65D 59/00 138/89 |
| 3,744,528 A * | 7/1973 | Vestal | ............... | B65D 59/06 138/89 |
| 4,335,756 A * | 6/1982 | Sharp | ............... | F16L 55/115 138/89 |
| 5,722,562 A * | 3/1998 | Kick | ............... | B65D 43/0218 215/320 |
| 8,353,315 B2 * | 1/2013 | Gadawski | ............... | H01M 10/60 138/89 |
| 2008/0092977 A1 * | 4/2008 | Zeyfang | ............... | F16L 55/115 138/96 R |
| 2012/0247607 A1 * | 10/2012 | MacNeill | ............... | F16L 55/115 138/96 R |

* cited by examiner

*Primary Examiner* — Patrick M. Buechner

(74) *Attorney, Agent, or Firm* — Hall Estill Law Firm

(57) ABSTRACT

Apparatus and methods for containing leakage of a grease gun. In certain embodiments, a cover includes a body which has an open end, a closed end, and a sidewall extending between the open end and the closed end. The sidewall has an outer peripheral surface and an inner peripheral surface which encompasses an inner space for receiving a leaking lubricant.

6 Claims, 3 Drawing Sheets

COVER AND METHODS OF MAKING AND USING SAME

CROSS-REFERENCE TO RELATED APPLICATIONS/INCORPORATION BY REFERENCE STATEMENT

The present patent application claims priority to U.S. Provisional Patent Application Ser. No. 62/286,087, filed on Jan. 22, 2016, the entire contents of which is hereby expressly incorporated herein by reference.

FIELD OF THE INVENTION

The present disclosure relates generally to grease guns, and more particularly, not by way of limitation, to a cover for containing leakage from a non-dispensing end of a grease gun.

BACKGROUND OF THE INVENTION

Grease guns are generally used to provide lubricants to various objects. One common problem is leakage of oil or other lubricant from the non-dispensing end of the grease gun when being stored or not being used.

To this end, a need exists for containing leakage from the non-dispensing end of a grease gun. It is to such a cover that the present disclosure is directed.

BRIEF DESCRIPTION OF THE DRAWING(S)

DETAILED DESCRIPTION OF THE INVENTION

Figure 1:
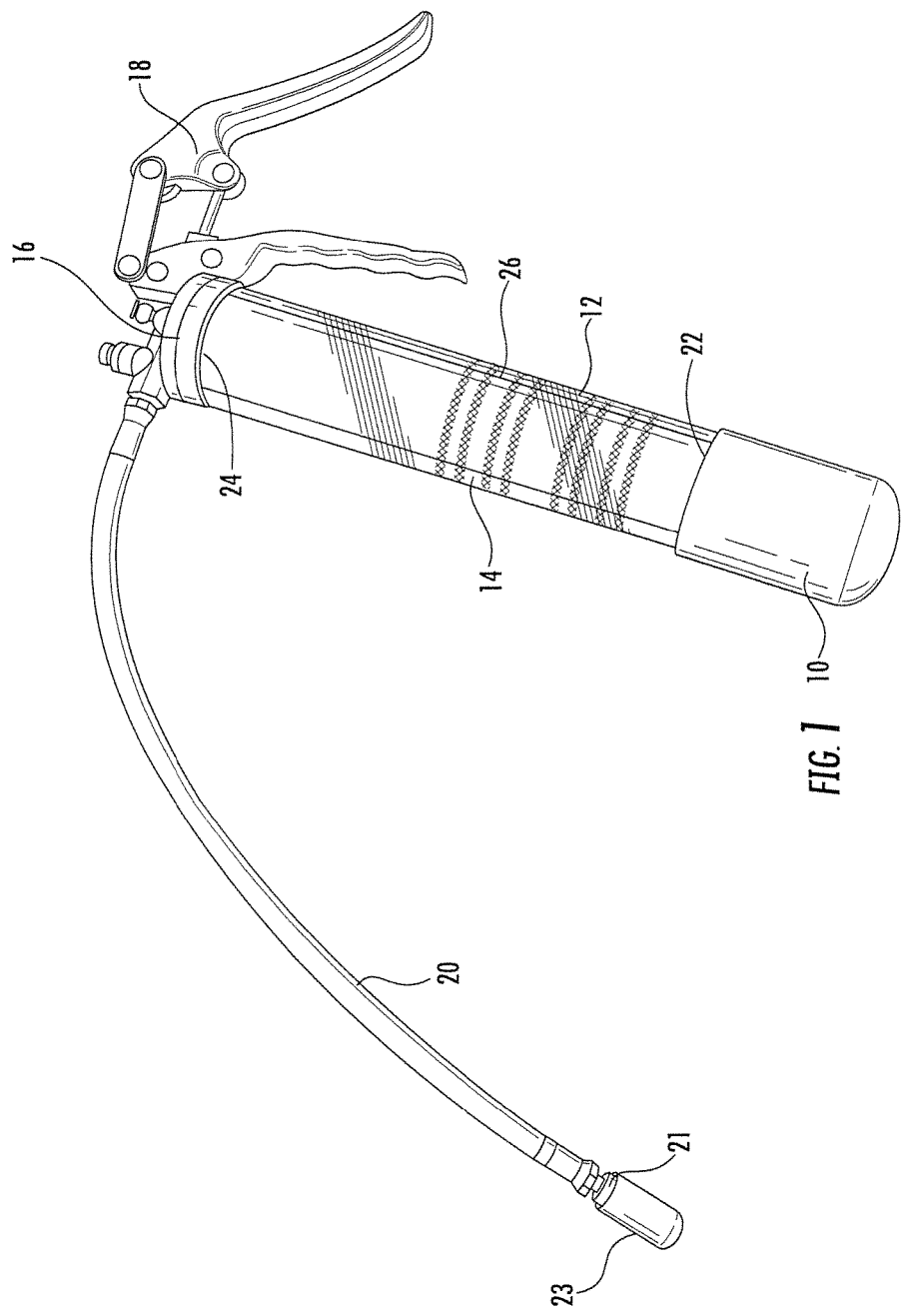
FIG. 1 is a perspective view of one embodiment of a cover constructed in accordance with the present disclosure, the cover being positioned about a grease gun.

Before explaining at least one embodiment of the inventive concept disclosed herein in detail, it is to be understood that the inventive concept is not limited in its application to the details of construction, experiments, exemplary data, and/or the arrangement of the components set forth in the following description, or illustrated in the drawings. The presently disclosed and claimed inventive concept is capable of other embodiments or of being practiced or carried out in various ways. Also, it is to be understood that the phraseology and terminology employed herein is for purpose of description only and should not be regarded as limiting in any way.

In the following detailed description of embodiments of the inventive concept, numerous specific details are set forth in order to provide a more thorough understanding of the inventive concept. However, it will be apparent to one of ordinary skill in the art that the inventive concept within the disclosure may be practiced without these specific details. In other instances, well-known features have not been described in detail to avoid unnecessarily complicating the instant disclosure.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or at least one and the singular also includes the plural unless it is obvious that it is meant otherwise.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Figure 2:
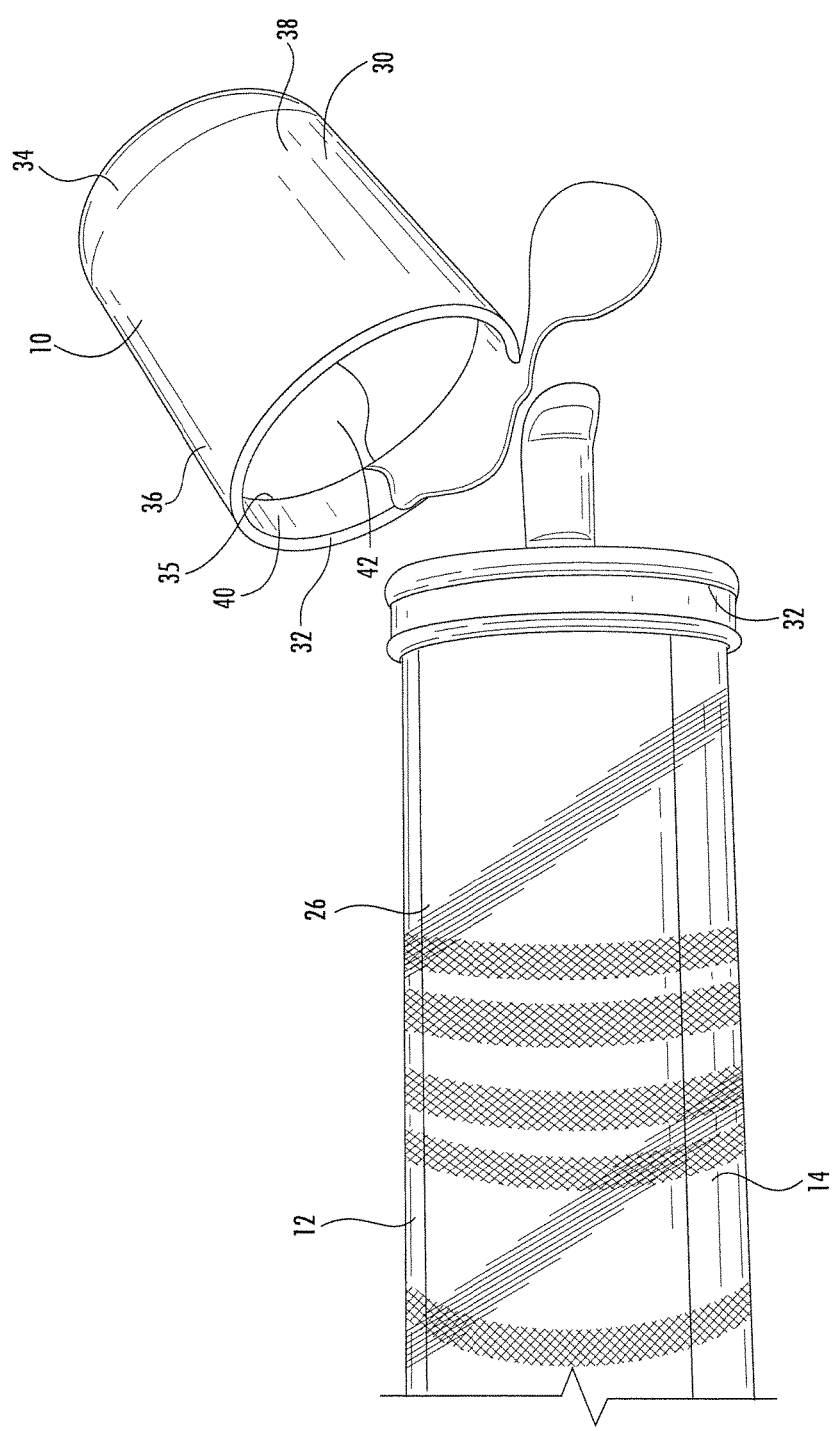
FIG. 2 is a perspective view of the cover of FIG. 1.
Figure 3:
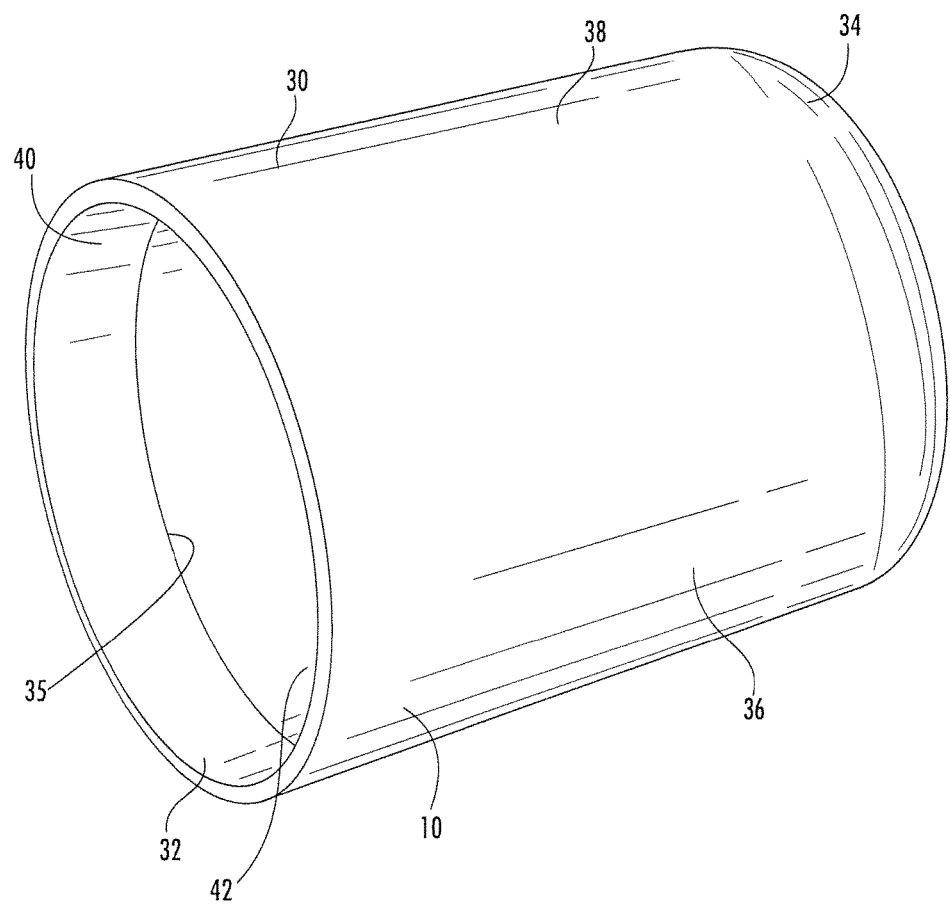
FIG. 3 is a perspective view of the cover of FIG. 1.

Referring now to the drawings, and more particularly to FIGS. 1-3, shown therein is one embodiment of a cover 10 constructed in accordance with the inventive concepts disclosed herein, the cover 10 being shown positioned about a conventional grease gun 12 used to apply lubricant to an object. The grease gun 12 includes a barrel 14 for receiving a lubricant, an end cap 16, a handle 18, a hose 20 and a coupler connector 21. In one embodiment, a cover 23 is positioned about the coupler connector 21, so as to prevent leakage of the lubricant form the grease gun 12. The barrel 14 has a first end 22 (non-dispensing end), a second end 24 (dispensing end) and an outer surface 26. The end cap 16 is attached to the second end 24 of the barrel 14. The handle 18 and the hose 20, which is used to dispense the lubricant, are attached to the end cap 16. A grease gun is a common tool used for lubrication and is well known to one of ordinary skill in the art. Thus, no further discussion is necessary regarding the grease gun or its operation.

It is contemplated, in one embodiment, that the cover 10 is constructed from a single component, however, it should be understood by one of ordinary skill in the art that the cover 10 may be constructed from a multiple pieces of materials. The cover 10 is preferably made of elastomeric materials, such as neoprene, rubber, latex or other such elastomeric polymer which enables the cover 10 to return to its original shape once removed from the grease gun 12. However, the materials are strong enough to allow for use of the cover 10, as disclosed herein. The cover 10 may be constructed from a variety of durable and resilient materials, such as for example, polymeric materials, plastics, thermoplastics, any elastomers, and composite materials which are capable of providing the desired strength and durability for the cover 10. Further, it should be understood that the cover 10 may be constructed from materials that may be water-resistant and/or waterproof so that the cover 10 may be easily cleaned. The cover 10 may be any color which can be used to identify the grade of grease in the grease gun by the different colored cover 10.

The cover 10 is shown as substantially conical in shape. However, it should be understood that the cover 10 or portions thereof may be any shape, such as circular, oval, square, rectangular, triangular, polygonal, quadrilateral, ellipsoidal and the like, for example. The cover 10 may be rigid, semi-rigid, flexible, semi-flexible, foldable, collapsible, and the like. It should be understood that the size and configuration of the cover 10, and portions thereof, may vary widely dependent upon the size of the grease gun 12 and the amount of oil which leaks from the grease gun 12. It should be understood by one of ordinary skill in the art that the cover 10, although discussed herein as being used with a grease gun, may be utilized and configured in a variety of shapes and capacities to contain and/or prevent leakage for other containers, tools, and the like.

The cover has a body 30 which includes an open first end 32, a closed second end 34, and a sidewall 36 extending between the open end 32 and the closed end 34. An inner lip 35 is provided about the open end 32 to help secure the cover 10 to the grease gun 12 and provide a connection between the cover 10 and the grease gun 12. The closed end 34 is shown herein as being rounded in shape. It will be appreciated, however, that the closed end 34 of the cover 10 may be configured in and comprise variations of any shapes or may comprise significantly altered shapes such as square or rectangular, as long as the cover 10 functions in accordance with the present invention in the manner described herein. The sidewall 36 has an outer peripheral surface 38 and an inner peripheral surface 40 which encompasses an inner space 42 for receiving any leaking lubricant.

In use, when storing or not using the grease gun 12, the open end 32 of the cover 10 is stretched and positioned about the first end 22 of the grease gun 12 to engage the outer surface 26 of the barrel 14 of the grease gun 12. A relatively airtight seal is created between the outer surface 26 of the barrel 14 and the inner peripheral surface 40 of the cover 10. Leaking lubricant from the first end 22 of the grease gun 12, the non-dispensing end 22 of the grease gun 12, is caught and collected in the inner space 42 of the cover 10.

Additionally, the cover 10 may be utilized as a priming bulb for a grease gun in which the grease is having a difficult time exiting the grease gun 12. The cover 10 is vented and primed to allow grease flow easily from the grease gun 12.

In another embodiment, the cover 10 may be constructed in a rolled configuration and then placed in an unrolled configuration when used to seal the cover 10 on the grease gun 12. When rolled, the inner peripheral surface 40 of the cover 10 is exposed. The exposed inner peripheral surface 40 contacts the outer surface 26 of the grease gun 12 and unrolls the cover 10 such that the sidewall 36 of the grease gun 12 overlaps the outer surface 26 of the barrel 14 of the grease gun 12.

In one embodiment, the cover 10 may have an elastomeric first portion, proximate the open end of the cover 10, constructed of material having elastomeric properties which allows the elastomeric first portion to expand when the first end of the grease gun is disposed within the cover 10 when the elastomeric first portion of the cover 10 is stretched about the first end of the grease gun. The elastomeric first portion may be comprised of neoprene, lycra, rubber, elasticized fabrics, or any other such materials which have elastic properties, as described herein. The elastomeric first portion of the cover 10 will grip the adjacent portion of the grease gun and will cause the elastomeric first portion of the cover to closely conform to the shape of the grease gun and will secure the cover 10 to the grease gun leaving a substantially airtight seal with an inner space, as explained above. The cover 10 may have a second portion constructed from a non-elastomeric material, proximate the closed end of the cover 10. The elastomeric portion may be a separate component connected to open end of the cover 10. Alternatively, the elastomeric portion may be of unitary construction with the non-elastomeric of the cover 10, or an extension therein. The cover 10 may be constructed from a material which is impregnated with an elastic material in one portion to form the elastomeric portion.

From the above description, it is clear that the inventive concept(s) disclosed herein is well adapted to carry out the objects and to attain the advantages mentioned herein as well as those inherent in the inventive concept disclosed herein. While exemplary embodiments of the inventive concept disclosed herein have been described for purposes of this disclosure, it will be understood that numerous changes may be made which will readily suggest themselves to those skilled in the art and which are accomplished without departing from the scope of the inventive concept disclosed herein and defined by the appended claims.

What is claimed is:

1. A method for containing leakage from a grease gun, comprising:
    providing a body constructed from an elastomeric material, the body having an open end, a closed end, and a sidewall extending between the open end and the closed end, the sidewall having an outer peripheral surface and an inner peripheral surface which encompasses an inner space at the closed end for receiving and containing a leaking lubricant;
    positioning the open end of the body about a non-dispensing end of a grease gun such that the inner peripheral surface of the body is in contact with an outer surface of the grease gun to form a relative airtight seal between the non-dispensing end of the grease gun and the cover so that the inner space receives and contains lubricant leaking from the non-dispensing end of the grease gun.

2. The method of claim 1 wherein the open end is provided with an inner lip to help secure the cover and the grease gun.

3. The method of claim 1 wherein the inner space is formed in a portion of the body of the cover.

4. The method of claim 1 wherein the closed end of the cover is rounded.

5. The method of claim 1 further comprising the step of:
    applying pressure to the closed end of the body so as to prime the grease for operation of the grease gun.

6. The method of claim 5 further comprising the step of:
    removing the body from the grease gun.

\* \* \* \* \*